(12) United States Patent
Lindner et al.

(10) Patent No.: US 9,085,990 B2
(45) Date of Patent: *Jul. 21, 2015

(54) USE OF LAYER STRUCTURES IN WIND POWER PLANTS

(75) Inventors: Stefan Lindner, Köln (DE); Klaus Franken, Bergisch-Gladbach (DE); Dirk Passmann, Oberhausen (DE); Peter Nordmann, Dormagen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/001,207

(22) PCT Filed: Feb. 20, 2012

(86) PCT No.: PCT/EP2012/052847
§ 371 (c)(1),
(2), (4) Date: Aug. 23, 2013

(87) PCT Pub. No.: WO2012/113748
PCT Pub. Date: Aug. 30, 2012

(65) Prior Publication Data
US 2013/0330202 A1   Dec. 12, 2013

(30) Foreign Application Priority Data
Feb. 25, 2011   (DE) .......... 10 2011 004 723

(51) Int. Cl.
| | | |
|---|---|---|
| F01D 5/28 | (2006.01) |
| B21D 53/78 | (2006.01) |
| B32B 5/22 | (2006.01) |
| B32B 5/26 | (2006.01) |
| B32B 5/28 | (2006.01) |
| B32B 27/40 | (2006.01) |
| F03D 1/06 | (2006.01) |

(52) U.S. Cl.
CPC . *F01D 5/282* (2013.01); *B32B 5/22* (2013.01); *B32B 5/26* (2013.01); *B32B 5/28* (2013.01); *B32B 27/40* (2013.01); *F03D 1/0675* (2013.01); *F05C 2225/00* (2013.01); *Y02E 10/721* (2013.01); *Y10T 29/49337* (2015.01)

(58) Field of Classification Search
CPC ... F01D 5/282; F01D 1/0675; F05C 2225/00; B32B 5/22; B32B 5/26; B32B 5/28; B32B 5/40; Y02E 10/721
USPC .................................. 416/229 R, 230, 229 A
See application file for complete search history.

(56) References Cited

U.S. PATENT DOCUMENTS

| | | | |
|---|---|---|---|
| 5,885,394 A * | 3/1999 | Scherzer et al. ............... 156/242 |
| 2012/0070671 A1 | 3/2012 | Genz et al. | |
| 2012/0244006 A1 * | 9/2012 | Passmann et al. ............ 416/230 |
| 2013/0230716 A1 * | 9/2013 | Schmidt et al. ............... 428/339 |

FOREIGN PATENT DOCUMENTS

| | | |
|---|---|---|
| WO | WO-2010125012 A1 | 11/2010 |
| WO | WO-2012022683 A1 | 2/2012 |

OTHER PUBLICATIONS

International Search Report for PCT/EP2012/052847 mailed May 25, 2012.

* cited by examiner

*Primary Examiner* — Thao T Tran
(74) *Attorney, Agent, or Firm* — Drinker Biddle & Reath LLP

(57) ABSTRACT

The invention relates to the use of layer structures in the production of rotor blades for wind power plants, and to rotor blades for wind power plants.

10 Claims, No Drawings

USE OF LAYER STRUCTURES IN WIND POWER PLANTS

PRIORITY

Priority is claimed as a national stage application, under 35 U.S.C. §371, to PCT/EP2012/052847, filed Feb. 20, 2012, which claims priority to German application 10 2011 004 723.9, filed Feb. 25, 2011. The disclosures of the aforementioned priority applications are incorporated herein by reference in their entirety.

The invention relates to the use of layer structures in the production of rotor blades for wind power plants, and to rotor blades for wind power plants.

Energy from wind power is becoming increasingly more important, so that wind power plants, in particular the rotor blades and the production thereof, are being researched intensively and developed further. A main focus of attention is the quality of the rotor blades that are produced, and cost-effective production. The hitherto known rotor blades for wind power plants consist of fibre-reinforced plastics based on resins as matrix material, such as, for example, polyester resins (UP), vinyl ester resins (VE), epoxy resins (EP). The production of the blades is mainly carried out by producing each of a lower half and an upper half of the vane in one piece. The two halves are subsequently placed together and bonded. Struts or cords are also bonded in for reinforcement.

In the production of the vane halves, fibre composites are first produced, which must cure. This curing process is very time-consuming and disadvantageous for rapid overall production. The rotor blades for wind power plants made from the above-mentioned resins are conventionally produced by hand lay-up, by hand lay-up assisted by prepreg technology, by winding methods or by the vacuum-assisted infusion process. In the case of hand lay-up, a mould is first prepared by applying a release agent and optionally a gel coat to the mould surface. Non-crimped glass fabrics with unidirectional or biaxial orientation are subsequently placed in succession into the mould. The resin is then applied to the non-crimped fabric and pressed into the non-crimped fabric manually by rolling. This step can be repeated as often as necessary. In addition, cords as reinforcing material and other parts, such as, for example, lightning protection devices, can be incorporated. To this first glass-fibre-reinforced layer there are applied a so-called spacer layer, generally of balsa wood, polyvinyl chloride (PVC) foam or polyurethane (PUR) foam, and a second glass-fibre-reinforced layer analogous to the first. Although this process has the advantage that investment in terms of machinery is low and fault detection and correction are simple, manufacture is too labour-intensive, as a result of which the costs of the process are very high, and the long manufacturing times lead to more faults and to a high outlay for quality control.

The process of hand lay-up assisted by prepreg technology is carried out in a similar manner to the simple hand lay-up process. However, the so-called prepregs (prefabricated glass mats impregnated with resin) are produced outside the mould and then positioned in the rotor blade mould. Although the partial automation, as compared with simple hand lay-up, which is carried out for manufacture of the prepregs results in improved quality consistency in rotor manufacture, protecting the workers from the readily volatile compounds contained in the liquid resin mixtures constitutes a not inconsiderable outlay (safety in the workplace, etc.).

In the resin injection process (also known as "resin transfer moulding" (RTM) or "vacuum-assisted resin transfer moulding" (VA RTM) or "SCRIMP process" (Seemann Composites Resin Infusion Moulding Process)), the moulds are prepared by applying a release agent and optionally a gel coat. The dry fibre mats are subsequently placed into the mould according to a precise manufacturing plan. The first layer inserted will later form the layer of the rotor blade that is located on the outside. The spacer materials are then inserted, on which fibre mats are again placed, which then form the inner layer of the finished rotor half/rotor half-shell. For the production of large mouldings, such as rotor blades, the vacuum-assisted infusion process is preferably used. The mould as a whole is then closed hermetically with a vacuum-tight film. From the mould so prepared, the air is removed from the fibre mats and the spacer materials before the resin is injected into the mould (space between the film and the mould) at various locations. This process—like the two processes mentioned above—has the disadvantage that the necessary curing time of up to 12 hours until the component can be demoulded is very long, and the productivity of the installations is limited very considerably thereby.

It was, therefore, an object of the present invention to provide rotor blades which do not have the above-mentioned disadvantages and, in addition, can be produced cost-effectively in a shorter time and with better mechanical properties, such as, for example, higher strength.

Surprisingly, it has been possible to achieve that object by producing the rotor blades using as the plastics material, instead of the resins mentioned above, polyurethane obtainable by the reaction of polyisocyanate with glycerol-started polypropylene oxide polyol. Polyurethane is used according to the invention as the plastics material in particular in the outer covering of the rotor blade; the fibre layers used in the outer covering are treated therewith.

The invention provides rotor blades for wind power plants which have an outer covering which consists at least partially of a layer structure having the following layers
   a) a release agent layer
   b) optionally a gel coat layer
   c) a fibre layer treated with plastics material
   d) optionally a spacer layer
   e) a fibre layer provided with plastics material
   f) optionally a plastics film
and which is characterised in that there is used as the plastics material polyurethane obtainable by reaction of a reaction mixture comprising
   A) one or more polyisocyanates
   B) a polyol formulation comprising one or more glycerol-started polypropylene oxide polyols
   C) optionally additives and/or added ingredients
   D) optionally fillers.

The invention further provides a process for the production of the rotor blades for wind power plants according to the invention, which rotor blades have an outer covering which consists at least partially of a layer structure having the following layers
   a) a release agent layer
   b) optionally a gel coat layer
   c) a fibre layer treated with plastics material
   d) optionally a spacer layer
   e) a fibre layer provided with plastics material
   f) optionally a plastics film,
characterised in that the fibre layers are treated with a reaction mixture for the preparation of polyurethane as the plastics material, wherein the reaction mixture is obtainable from the components
   A) one or more polyisocyanates
   B) a polyol formulation comprising one or more glycerol-started polypropylene oxide polyols C) optionally additives and/or added ingredients D) optionally fillers.

The invention further provides the use of a layer structure in the production of rotor blades for wind power plants, wherein the layer structure has the following layers a) a release agent layer b) optionally a gel coat layer c) a fibre layer treated with plastics material d) optionally a spacer layer e) a fibre layer provided with plastics material f) optionally a plastics film and is characterised in that there is used as the plastics material polyurethane obtainable by reaction of a reaction mixture comprising A) one or more polyisocyanates B) a polyol formulation comprising one or more glycerol-started polypropylene oxide polyols C) optionally additives and/or added ingredients D) optionally fillers.

For the release agent layer there are preferably used silicone- or wax-containing release agents. These are known from the literature. A release film may optionally also be used as the release agent layer.

The gel coat layer preferably consists of polyurethane, epoxy, unsaturated polyester or vinyl resins.

There can be used as the fibre layer preferably layers of randomly oriented glass fibres, woven and non-crimped glass fabrics, cut or ground glass or mineral fibres, as well as fibre mats, nonwovens and knitted fabrics based on polymer, mineral, carbon, basalt, steel, glass or aramid fibres and mixtures thereof, particularly preferably glass fibre mats or glass fibre nonwovens. The fibre content in the fibre layer provided with polyurethane is preferably from 40 to 90 wt. %, more preferably from 50 to 80 wt. % and particularly preferably from 60 to 75 wt. %. In the case of glass-fibre-reinforced components, the fibre content can be determined, for example, by incineration. There can be used as the spacer layer preferably plastics foams, such as, for example, PVC foams, PET foams or polymethacrylimide foams, wood, such as, for example, balsa wood, or metal.

The plastics film f) that is optionally used can remain as a layer in the casing in the production of the rotor blade or can be removed when the half of the rotor blade is demoulded. It serves in particular to seal the mould half-shell, which is equipped with the above-mentioned layers, in the production process for evacuation prior to filling with the liquid resin mixture. Auxiliary agents, such as, for example, peel films or flow aids, such as, for example, flow-assisting fabrics or slit films, can optionally also be used between the fibre layer e) provided with plastics material and the plastics film f). If required, these can additionally be used to achieve uniform impregnation of the fibre layer e). They are preferably removed again after production of the layer structure in order to save weight in the finished rotor blade.

Polyurethane is used as the plastics material. Polyurethanes are obtainable by the reaction of polyisocyanates A) with compounds B) having at least two isocyanate-reactive hydrogen atoms. Surprisingly, by using a glycerol-started polypropylene oxide polyol (propoxylated glycerol) as component B) it was possible to obtain a polyurethane which exhibits a very slow viscosity rise during production but can be cured rapidly and which exhibits significantly better mechanical properties in the finished glass-fibre-reinforced polyurethane than with the use of the plastics materials employed hitherto.

The reaction mixture used according to the invention is injected into the prepared evacuated layer structure.

The polyol formulation preferably comprises as the glycerol-started polypropylene oxide polyols those which have an OH number of from 250 to 1000 mg KOH/g, preferably from 300 to 800 mg KOH/g and particularly preferably from 350 to 500 mg KOH/g. The viscosity of the polyols is preferably ≤800 mPas (at 25° C.), more preferably ≤500 mPas (at 25° C.). When a plurality of starters is used to prepare polypropylene oxide polyols, the amount by weight of glycerol in the starter mixture is preferably from 50 to 100 wt. %, more preferably from 80 to 100 wt. %. Purely glycerol-started polypropylene oxide polyols are particularly preferred.

Other conventional starters, such as, for example, 1,1,1-trimethylolpropane, triethanolamine, sorbitol, pentaerythritol, ethylene glycol, propylene glycol, can be used only in combination with glycerol.

There are used as the polyisocyanate component the conventional aliphatic, cycloaliphatic and in particular aromatic di- and/or poly-isocyanates. Examples of such suitable polyisocyanates are 1,4-butylene diisocyanate, 1,5-pentane diisocyanate, 1,6-hexamethylene diisocyanate (MI), isophorone diisocyanate (IPDI), 2,2,4- and/or 2,4,4-trimethylhexamethylene diisocyanate, bis(4,4'-isocyanatocyclohexyl) methane or mixtures thereof with the other isomers, 1,4-cyclohexylene diisocyanate, 1,4-phenylene diisocyanate, 2,4- and/or 2,6-toluene diisocyanate (TDI), 1,5-naphthylene diisocyanate, 2,2'- and/or 2,4'- and/or 4,4'-diphenylmethane diisocyanate (MDI) and/or higher homologues (pMDI) thereof, 1,3- and/or 1,4-bis-(2-isocyanatoprop-2-yl)-benzene (TMXDI), 1,3-bis-(isocyanatomethyl)benzene (XDI). There is preferably used as the isocyanate diphenylmethane diisocyanate (MDI) and in particular mixtures of diphenylmethane diisocyanate and polyphenylenepolymethylene polyisocyanate (pMDI). The mixtures of diphenylmethane diisocyanate and polyphenylenepolymethylene polyisocyanate (pMDI) have a preferred monomer content of from 50 to 100 wt. %, preferably from 60 to 95 wt. %, particularly preferably from 70 to 90 wt. %. The NCO content of the polyisocyanate that is used should preferably be over 25 wt. %, more preferably over 30 wt. %, particularly preferably over 31.4 wt. %. Preferably, the MDI that is used should have a content of 2,2'-diphenylmethane diisocyanate and 2,4'-diphenylmethane diisocyanate together of at least 3 wt. %, more preferably at least 20 wt. %. The viscosity of the isocyanate should preferably be ≤250 mPas (at 25° C.), more preferably ≤100 mPas (at 25° C.) and particularly preferably ≤30 mPas (at 25° C.).

The polyurethane reaction mixture can preferably comprise in addition to the known reactive components and additives and added ingredients preferably fillers, such as carbon nanotubes, barium sulfate, titanium dioxide, short glass fibres or natural fibre- or plate-like minerals, such as, for example, wollastonite or muscovite. There are preferably used as additives and added ingredients stabilisers, antifoams, catalysts and latent catalysts. Further known additives and added ingredients can be used if required.

Suitable polyurethane systems are in particular those which are transparent. Because a low viscosity is necessary in the production of larger mouldings for uniform filling of the mould and wetting of the fibres, particularly suitable polyurethane systems are therefore those which have a viscosity of ≤5000 mPas (at 35° C.; 60 min after mixing of the components), preferably ≤4000 mPas, particularly preferably ≤3500 mPas, and which, directly after mixing of the components of the reaction mixture, have a viscosity of from 30 to 500 mPas (at 35° C.), preferably from 40 to 150 mPas (at 35° C.) and particularly preferably from 50 to 100 mPas (at 35° C.). The conversion ratio between isocyanate component and polyol formulation is preferably so chosen that the ratio of the number of isocyanate groups to the number of isocyanate-reactive groups in the reaction mixture is from 0.9 to 1.5, preferably from 1.0 to 1.2, particularly preferably from 1.02 to 1.15.

The polyurethane that is obtained preferably has a strength in the tensile test according to DIN EN ISO 527 of over 70 MPa, preferably over 80 MPa, in order to withstand the high mechanical stresses in a rotor blade.

In a preferred embodiment, the reaction mixture of isocyanate component and polyol component is injected at a temperature of from 20 to 80° C., particularly preferably from 25 to 40° C.

After introduction of the reaction mixture, curing of the polyurethane can be accelerated by heating of the mould. In a preferred embodiment, the injected reaction mixture of isocyanate component and compounds having at least two isocyanate-reactive hydrogen atoms is cured at a temperature of from 40 to 160° C., preferably from 60 to 120° C., particularly preferably from 70 to 90° C.

The invention is to be explained in greater detail by means of the following examples.

EXAMPLES

In order to determine the matrix properties, moulded bodies (sheets) were produced from various polyurethane systems and compared with a standard epoxy resin system. The polyols were degassed for 60 minutes at a pressure of 1 mbar; Desmodur® VP.PU 60RE11 was then added, degassing was carried out for about 5 minutes at a pressure of 1 mbar, and then the mixture was poured into the sheet moulds. The thickness of the sheets was 4 mm. The sheets were poured at room temperature and tempered overnight in a drying cabinet heated at 80° C. Transparent sheets were obtained. In an analogous manner, the epoxy resin system of Larit RIM 135 and the curing agent Larit RIMIR 137 was degassed, poured to form sheets and tempered overnight. The amounts and properties are to be found in the table.

Specimens for a tensile test according to DIN EN ISO 527 were produced from the sheets, and the modulus of elasticity and the strength were determined.

Polyurethane sheets 1 to 4 could be demoulded after only 2 hours without deformation; in the case of Comparison Example 5, that was possible only after a significantly longer time of about 12 hours.

With the composition of Examples 1 and 2, transparent, glass-fibre-reinforced polyurethane materials can be produced by the vacuum infusion process with a glass fibre content of over 60 wt. %.

For the production of fibre-reinforced moulded bodies by vacuum infusion, a Teflon tube having a diameter of 6 mm was filled with glass fibre rovings (Vetrotex® EC2400 P207) so that a glass fibre content of about 65 wt. %, based on the later component, was achieved. One side of the Teflon tube was immersed in the reaction mixture, and a vacuum was applied at the other side of the tube by means of an oil pump, so that the reaction mixture was drawn into the tube. When the tubes were full, they were tempered for 10 hours at 70° C. The Teflon tube was removed in each case and a transparent moulded body reinforced with fibres was obtained.

The viscosity was determined 60 minutes after mixing of the components at a constant temperature of 35° C. using a rotary viscometer at a shear rate of 60 1/s. In the production of larger mouldings, a low viscosity is necessary for a certain time for uniform filling of the mould.

Starting compounds:
Polyol 1: Glycerol-started polypropylene oxide polyol having a functionality of 3 and an OH number of 450 mg KOH/g and a viscosity of 420 mPas (at 25° C.).
Polyol 2: Glycerol-started polypropylene oxide polyol having a functionality of 3 and an OH number of 400 mg KOH/g and a viscosity of 370 mPas (at 25° C.).
Polyol 3: Trimethylolpropane (TMP)-started polypropylene oxide polyol having a functionality of 3 and an OH number of 380 mg KOH/g and a viscosity of 650 mPas (at 25° C.).
Polyol 4: Glycerol- and sorbitol—(weight ratio 30 to 70)—started polypropylene oxide polyol having an OH number of 430 mg KOH/g and a viscosity of about 9000 mPas (at 20° C.).

Desmodur® VP.PU 60RE11 is a mixture of diphenylmethane 4,4'-diisocyanate (MDI) with isomers and higher-functional homologues having an NCO content of 32.6 wt. %, viscosity at 25° C.: 20 mPas.

Larit RIM 135 (L-135i) and Larit RIMH 137 are products from Lange+Ritter. Larit RIM 135 is an epoxy resin based on a bisphenol A epichlorohydrin resin and a 1,6-hexanediol diglycidyl ether with an epoxy equivalent of 166-185 g/equivalent, and RIMH 137 is a curing agent based on IPDA (isophoronediamine) and alkyl ether amines with an amine number of 400-600 mg KOH/g.

All amounts in the following table are in parts by weight.

TABLE

|  | Example 1 | Example 2 | Comparison Example 3 | Comparison Example 4 | Comparison Example 5 |
|---|---|---|---|---|---|
| Polyol 1 | 200 | | | | |
| Polyol 2 | | 200 | | | |
| Polyol 3 | | | 200 | 170 | |
| Polyol 4 | | | | 30 | |
| Desmodur ® VP.PU 60RE11 | 227 | 202 | 192 | 196 | |
| Molar ratio NCO/OH | 110/100 | 110/100 | 110/100 | 110/100 | |
| Larit RIM 135 | | | | | 300 |
| Larit RIM 137 | | | | | 90 |
| Viscosity directly after mixing at 35° C. [mPas] | 65 | 66 | 74 | 91 | 126 |
| Viscosity 60 min. after mixing at 35° C. [mPas] | 3490 | 1420 | 7190 | 14300 | 234 |

TABLE-continued

|  | Example 1 | Example 2 | Comparison Example 3 | Comparison Example 4 | Comparison Example 5 |
|---|---|---|---|---|---|
| Tensile test: Modulus of elasticity [MPa] | 3038 | 2936 | 2990 | n.d. | 2950 |
| Tensile test: Strength [MPa] | 80.3 | 72.9 | 69.1 | n.d. | 68 | n.d.—not determined because the viscosity after 60 minutes was too high.

Examples 1 and 2 according to the invention, with a short demoulding time of 2 hours, exhibit a very good combination of a slow viscosity rise, with a low initial viscosity at 35° C., with a viscosity at 35° C. of less than 5000 mPas after 60 minutes, which is very important for the production of large fibre-reinforced structural components, and at the same time very good mechanical properties, such as, for example, a strength of over 70 MPa. Comparison Examples 3 and 4, by contrast, exhibit a significantly more rapid viscosity rise, with a slightly higher initial viscosity at 35° C., and a viscosity at 35° C. of far greater than 5000 mPas after 60 minutes, which makes the production of large fibre-reinforced components much more difficult. Comparison Example 5 exhibits a very slow viscosity rise but at the same time a significantly longer demoulding time (about 12 hours) than Examples 1 and 2 (about 2 hours). This results in lower productivity. In addition, the mechanical properties are poor, with a strength of below 70 MPa.

The invention claimed is:

1. A method for the production of rotor blades for wind power plants comprising providing a layer structure produced by a vacuum-assisted resin transfer moulding process, wherein the layer structure has the following layers
   a) a release agent layer
   b) optionally a gel coat layer
   c) a fibre layer treated with a plastic material
   d) optionally a spacer layer
   e) a fibre layer provided with a plastic material
   f) optionally a plastic film,
   and is,
   wherein the plastic material a polyurethane obtained from mixture comprising
   A) one or more polyisocyanates
   B) a polyol formulation comprising one or more glycerol-started polypropylene oxide polyols
   C) optionally additives and/or added ingredients
   D) optionally fillers.

2. A rotor blade for a wind power-plant comprising a covering which consists at least partially of a layer structure produced by a vacuum-assisted resin transfer moulding process having the following layers
   a) a release agent layer
   b) optionally a gel coat layer
   c) a fibre layer treated with a plastic material
   d) optionally a spacer layer
   e) a fibre layer provided with a plastic material
   f) optionally a plastic film,
   wherein the plastic material a polyurethane obtained from a reaction mixture comprising
   A) one or more polyisocyanates
   B) a polyol formulation comprising one or more glycerol-started polypropylene oxide polyols
   C) optionally additives and/or added ingredients
   D) optionally fillers.

3. A process for the production of a rotor blade according to claim 2 for a wind power plant, comprising providing a layer structure produced by a vacuum-assisted resin transfer moulding process, wherein the layer structure has the following layers
   a) a release agent layer
   b) optionally a gel coat layer
   c) a fibre layer treated with a plastic material
   d) optionally a spacer layer
   e) a fibre layer provided with a plastic material
   f) optionally a plastic film,
   wherein the fibre layers are treated with a polyurethane as the plastic material obtained from a reaction mixture comprising
   A) one or more polyisocyanate
   B) a polyol formulation comprising one or more glycerol-started polypropylene oxide polyol
   C) optionally additives and/or added ingredients
   D) optionally fillers.

4. The process according to claim 3, wherein the polyisocyanate comprises diphenylmethane diisocyanate and/or polyphenylenepolymethylene polyisocyanate having an NCO content of more than 25 wt. %.

5. The process according to claim 3, wherein the glycerol-started polypropylene oxide polyol comprises a compound having an OH number of from 300 to 800 mg KOH/g.

6. The process according to claim 3, wherein the reaction mixture is applied to the fibre layers at a temperature of from 20 to 80° C.

7. The process according to claim 3, wherein the reaction mixture is cured at a temperature of from 40 to 160° C.

8. The process according to claim 3 wherein, at a constant temperature of 35° C., the reaction mixture has a viscosity ≤5000 mPas 60 minutes after mixing.

9. The process according to claim 3, wherein the polyurethane has a tensile strength of over 70 MPa determined according to DIN EN ISO 527.

10. The process according to claim 3, wherein, at a constant temperature of 35° C., the reaction mixture has a viscosity ≤3500 mPas 60 minutes after mixing, and directly after mixing the reaction mixture has a viscosity of 50 to 100 mPas.

* * * * *